United States Patent
Kempeneers et al.

(10) Patent No.: US 10,811,862 B2
(45) Date of Patent: Oct. 20, 2020

(54) SEALABLE CABLE PORT ASSEMBLIES FOR TELECOMMUNICATIONS ENCLOSURE

(71) Applicant: CommScope Connectivity Belgium BVBA, Kessel-Lo (BE)

(72) Inventors: Dirk Kempeneers, Aarschot (BE); Eddy Luc Cams, Bilzen (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/575,735

(22) PCT Filed: May 20, 2016

(86) PCT No.: PCT/EP2016/061508
§ 371 (c)(1),
(2) Date: Nov. 20, 2017

(87) PCT Pub. No.: WO2016/185049
PCT Pub. Date: Nov. 24, 2016

(65) Prior Publication Data
US 2018/0294633 A1 Oct. 11, 2018

Related U.S. Application Data

(60) Provisional application No. 62/164,999, filed on May 21, 2015.

(51) Int. Cl.
*H02G 15/013* (2006.01)
*H02G 15/04* (2006.01)
*H02G 15/06* (2006.01)

(52) U.S. Cl.
CPC ......... *H02G 15/013* (2013.01); *H02G 15/046* (2013.01); *H02G 15/06* (2013.01)

(58) Field of Classification Search
CPC .... H02G 15/013; H02G 15/046; H02G 15/06; H02G 15/34; H02G 15/04; H02G 15/043;
(Continued)

(56) References Cited

U.S. PATENT DOCUMENTS 3,954,321 A * 5/1976 Casper ................. 439/275
4,323,727 A * 4/1982 Berg ..................... H02G 3/065
174/135

(Continued)

FOREIGN PATENT DOCUMENTS

EP  2 589 995 A1  5/2013
JP  2002-139634 A  5/2002
(Continued)

OTHER PUBLICATIONS

International Search Report and Written Opinion of the International Searching Authority for corresponding International Patent Application No. PCT/EP2016/061508 dated Sep. 9, 2016, 9 pages.

Primary Examiner — Paresh H Paghadal
(74) Attorney, Agent, or Firm — Merchant & Gould P.C.

(57) ABSTRACT

A sealing block assembly (110) protects telecommunications equipment from water and dust. The sealing block assembly (110) is disposed around a telecommunications cable (112), and the sealing block assembly (110) includes a housing (118, 218). The housing (118, 218) includes a first end (130, 230) and a second end (132, 232), the second end (132, 232) includes a plurality of movable fingers (128, 228). The sealing block assembly (110) also includes a seal (121) disposed within the housing (118, 218) between the movable fingers (128, 228) and the telecommunications cable (112). Further, the sealing block assembly (110) includes a clamp (122) disposed around the movable fingers (128, 228) of the housing (118, 218). The clamp (122) is configured to compress the movable fingers (128, 228) and the seal (121).

13 Claims, 18 Drawing Sheets

(58) Field of Classification Search
CPC ........ H02G 15/22; H02G 15/23; H02G 15/24; H02G 3/088; H02G 15/113; G02B 6/38; G02B 6/44
See application file for complete search history.

(56) References Cited

U.S. PATENT DOCUMENTS

| | | | | | |
|---|---|---|---|---|---|
| 5,313,019 | A * | 5/1994 | Brusselmans | ............ | C08L 53/02 174/77 R |
| 5,760,332 | A * | 6/1998 | Rocci | ................ | H01R 4/70 174/84 R |
| 6,069,320 | A * | 5/2000 | Rocci | ................ | H01R 4/70 174/84 R |
| 6,487,344 | B1 * | 11/2002 | Naudin | ............... | G02B 6/4471 385/100 |
| 8,313,250 | B2 * | 11/2012 | Drouard | ............... | G02B 6/4477 174/520 |
| 8,620,130 | B2 * | 12/2013 | Cooke | ................ | G02B 6/4465 385/138 |
| 2002/0079285 | A1 * | 6/2002 | Jansen | ................ | A61J 1/1406 215/249 |
| 2007/0025677 | A1 * | 2/2007 | Harrison | .............. | G02B 6/4471 385/138 |
| 2007/0093127 | A1 * | 4/2007 | Thomas | ............... | H01R 4/5033 439/578 |
| 2008/0298765 | A1 * | 12/2008 | Cox | ...................... | G02B 6/4444 385/139 |
| 2014/0038456 | A1 * | 2/2014 | Zhao | .................... | H01R 24/38 439/583 |
| 2014/0133823 | A1 | 5/2014 | Simmons et al. | | |
| 2015/0303617 | A1 * | 10/2015 | Smith | ................. | H01R 13/625 439/461 |

FOREIGN PATENT DOCUMENTS

| | | |
|---|---|---|
| WO | 90/05401 A1 | 5/1990 |
| WO | 92/22114 A1 | 12/1992 |
| WO | 2009/126411 A1 | 10/2009 |
| WO | 2010/047920 A2 | 4/2010 |
| WO | 2013/174992 A1 | 11/2013 |
| WO | 2015/050605 A1 | 4/2015 |

* cited by examiner

SEALABLE CABLE PORT ASSEMBLIES FOR TELECOMMUNICATIONS ENCLOSURE

CROSS-REFERENCE TO RELATED APPLICATION

This application is a National Stage Application of PCT/EP2016/061508, filed on May 20, 2016, which claims the benefit of U.S. Patent Application Ser. No. 62/164,999, filed on May 21, 2015, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers. Enclosures are sometimes installed underground and, due to this location, the enclosures can be exposed to moisture and, sometimes, submersion in water. Other telecommunications enclosures that are subject to moisture, and sometimes submersion in water, include electrical signals such as for coaxial or other copper telecommunications signal transmission.

Telecommunications enclosures are typically sealed to inhibit the intrusion of moisture or other contaminants. Cables enter the enclosures at sealed cable ports.

Improvements are desired.

SUMMARY

The present disclosure relates to cable seals, cable port assemblies, and telecommunications enclosures. More particularly, the disclosure relates to telecommunications enclosures including cable port assemblies that seal cables entering the enclosures.

In accordance with an aspect of the disclosure, a sealing block assembly for being disposed around a telecommunications cable is disclosed. The sealing block assembly includes a housing that includes a first end and a second end, the second end includes a plurality of movable fingers. The sealing block assembly also includes a seal disposed within an interior of the housing between the movable fingers and the telecommunications cable. Further, the sealing block assembly includes a clamp disposed around the movable fingers of the housing. The clamp is configured to compress the movable fingers and the seal.

The sealing block assembly preferably includes an outer containment retainer secured to the housing at the second end that is configured to contain the seal within the housing. Additionally, the sealing block assembly preferably includes an inner containment retainer positioned around the telecommunications cable and adjacent to the seal. The inner containment retainer is positioned within the interior of the housing between the first and second end.

The first end of the housing is received by a cable port of a telecommunications enclosure or other equipment or device.

In accordance with an additional aspect of the disclosure, a method for assembling a sealing block is disclosed. The method includes wrapping a cable with a sealing medium and inserting the cable into a sealing housing that has a plurality of movable fingers at one end. The method further includes positioning the sealing medium on the cable adjacent the movable fingers of the sealing housing and securing a clamp around the fingers. The method also includes compressing the fingers and the sealing medium by tightening the clamp.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
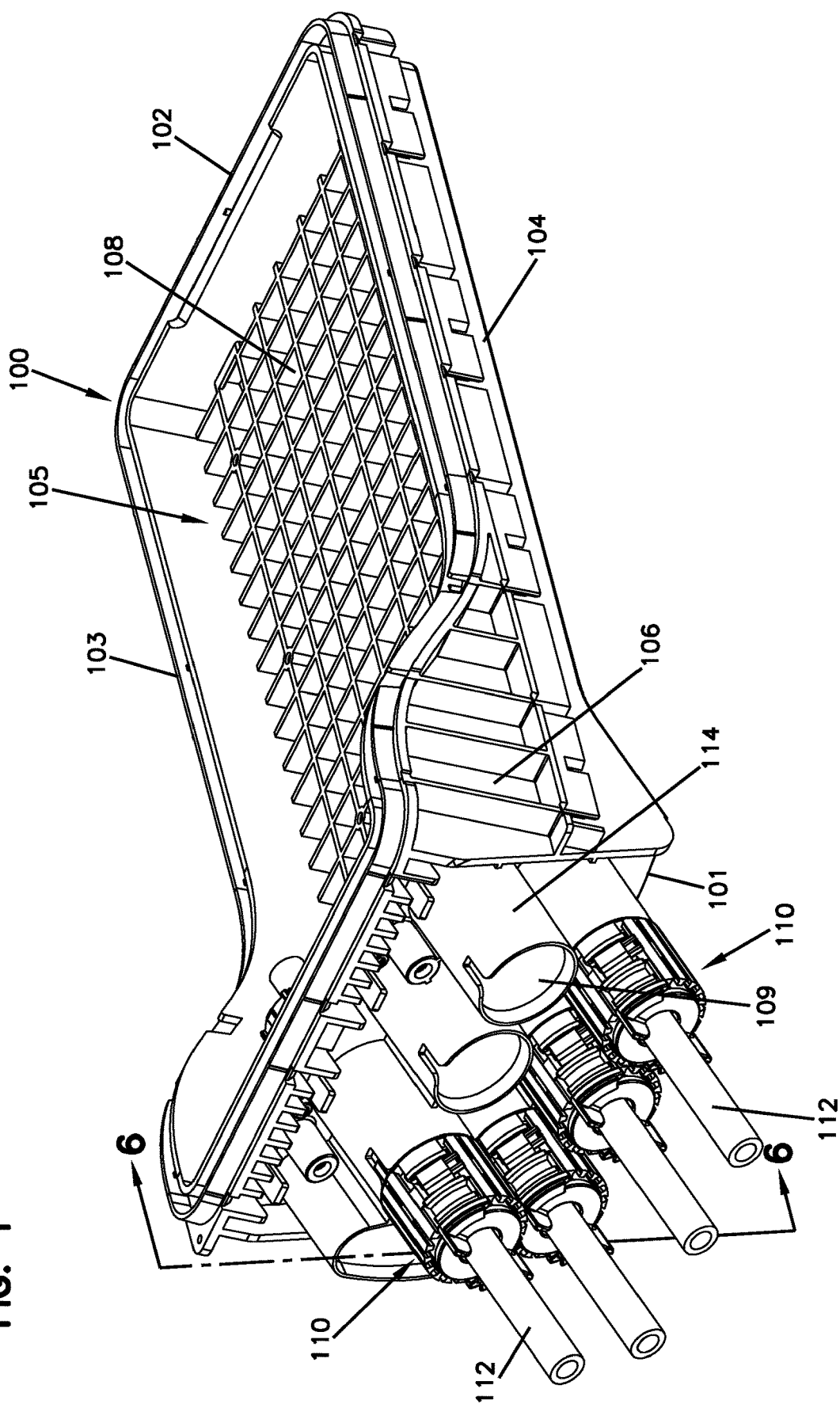
FIG. 1 illustrates a top, rear perspective view of an example base of an enclosure defining cable ports at a first end at which four cable port assemblies are received.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, cables may be routed into an enclosure through one or more cable ports. The cables are mounted to cable port assemblies to secure the cables to the enclosure and to seal the ports around the cables. Certain types of cable port assemblies include seal block assemblies to seal the ports. The cables may be copper, fiber, hybrid cables, or other cables.

FIG. 1 is a perspective view of an example base 100 of an example telecommunications enclosure assembly. A cover (not shown) closes the enclosure and typically houses telecommunications equipment. The base 100 extends from a first end 101 to a second end 102. The base 100 also extends from a first side 103 to a second side 104. The base 100 includes a sidewall 106 extending upwardly from a bottom 108 to define an interior 105. The base 100 is shaped and configured to cooperate with a cover to form an enclosure that defines the interior 105. When the cover is secured to the base 100, the cover inhibits dirt, water, or other contaminants from entering the enclosure. One or more telecommunications components may be mounted within the interior of the enclosure.

The base 100 defines one or more cable ports 109 at the first end 101 of the base 100. Each cable port 109 is configured to receive a sealing block assembly 110. Cables 112 are routed into and out of the enclosure through the sealing block assemblies 110. In the example shown, the base 100 includes seven ports 109. In other implementations, however, the base 100 may include a greater or lesser number of ports 109. Input and output cables may be routed into the base 100 through the ports 109. As used herein, the terms "input" and "output" are used for convenience and are not intended to be exclusory. Signals carried over cables 112 may travel in either or both directions. Accordingly, cables 112 routed through any of the ports 109 may carry input and/or output signals. In some embodiments, the cables 112 may be copper wire cables.

In some implementations, at least one of the ports 109 has a different size and/or shape from at least one other port 109. In the example shown, one of the ports 109 defines an oval or oblong cross-sectional profile, and the other six ports 109 define round cross-sectional profiles. In other implementations, each of the ports 109 may have any desired cross-sectional profile. In still other implementations, one or more of the round ports 109 may be larger or smaller than others of the round ports 109. Ducts 114 extend through the first end 101 of the base 100 to define the cable ports 109.

Figure 2:
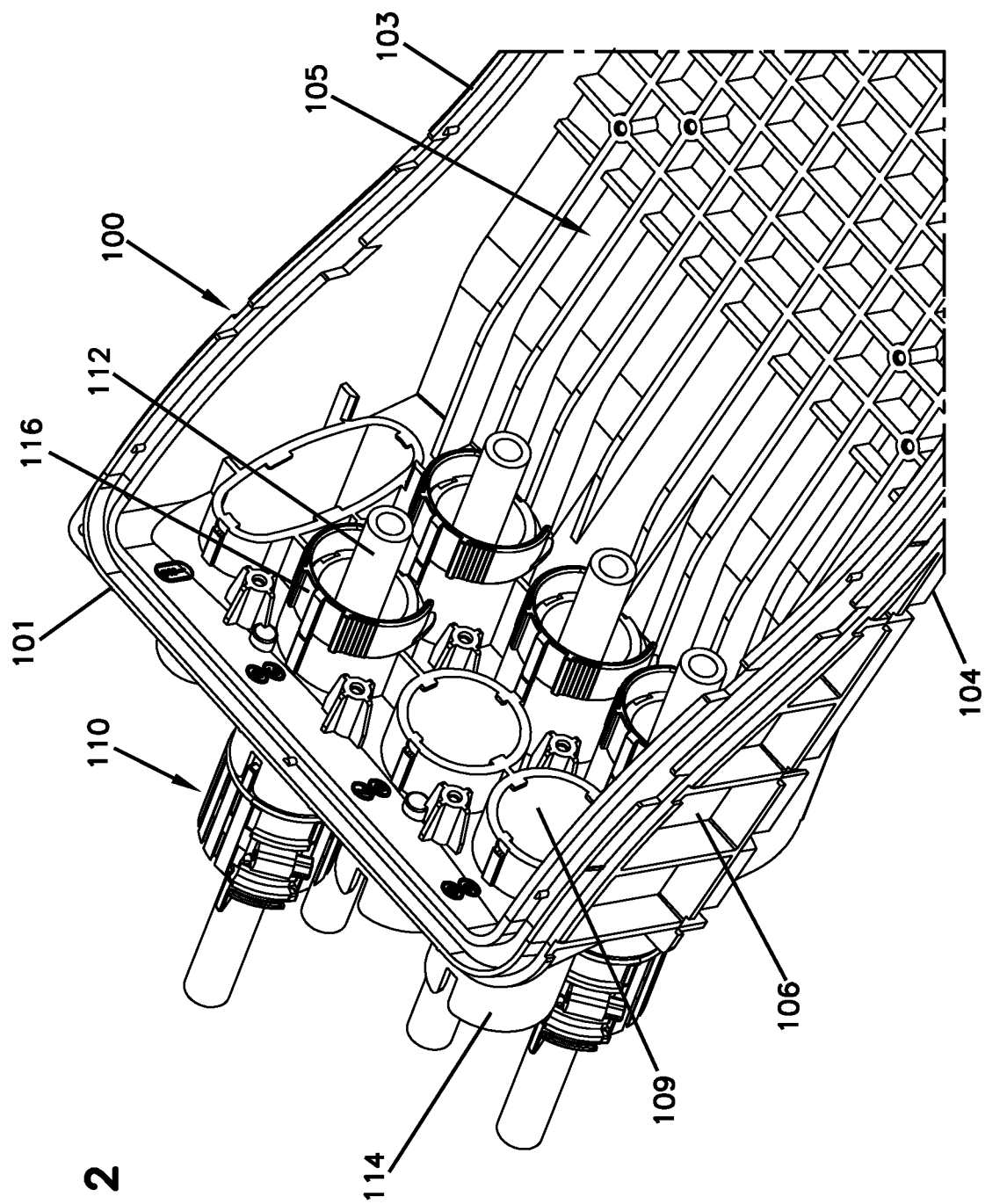
FIG. 2 illustrates a top, front perspective view of the first end of the base and the cable port assemblies.

FIG. 2 shows first end 101 of the base 100. The ports 109 are shown to provide access to the interior 105 of the enclosure. Some of the ports 109 can include a sealing block assembly 110 secured within the port 109. The sealing block assemblies 110 are configured to seal each port around each cable 112. In the depicted embodiment, the sealing block assemblies 110 are secured within each port 109 by way of a locking clip 116. The locking clip 116 is configured to engage the sealing block assembly 110 to prevent axial movement between the port 109 and the sealing block assembly 110. In some embodiments, the locking clip 116 is flexible so as to be slid over the sealing block assembly during installation. Other forms of securement may be provided in addition to, or instead of, the locking clip 116.

Figure 3:
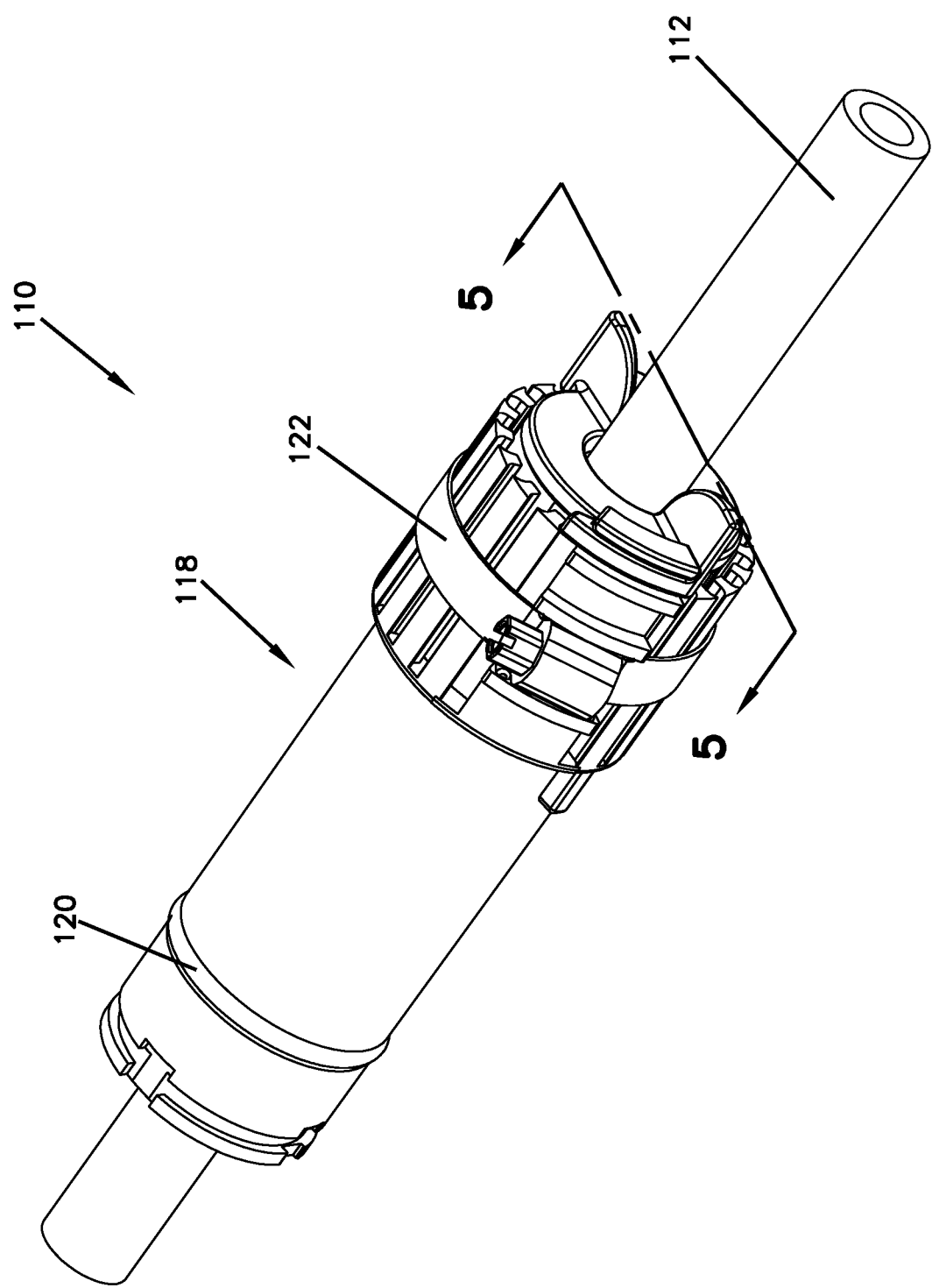
FIG. 3 illustrates a perspective view of a sealing block assembly.

FIG. 3 shows a perspective view of the sealing block assembly 110. The sealing block assembly 110 is configured to surround the cable 112 and provide a sealing bather around the cable 112. Specifically, the sealing block assembly 110 provides a seal between the sealing block assembly 110 and the port 109 and also a seal between the cable 112 and the sealing block assembly 110. The sealing block assembly 110 can be configured to be inserted in and removed from the port 109 multiple times to ease installation and maintenance. Further, the sealing block assembly 110 is configured to be assembled at a work site by a technician, allowing the technician to work on each sealing block assembly 110 outside of the enclosure.

The sealing block assembly 110 is configured to utilize a housing 118 that includes an external seal 120 to complete a seal between the sealing block assembly 110 and the port 109 of the enclosure. Additionally, the sealing block assembly 110 utilizes a clamp 122 around the housing 118 to compress the sealing block assembly 110 around the cable 112 to create a seal between the sealing block assembly 110 and the cable 112.

Figure 4:
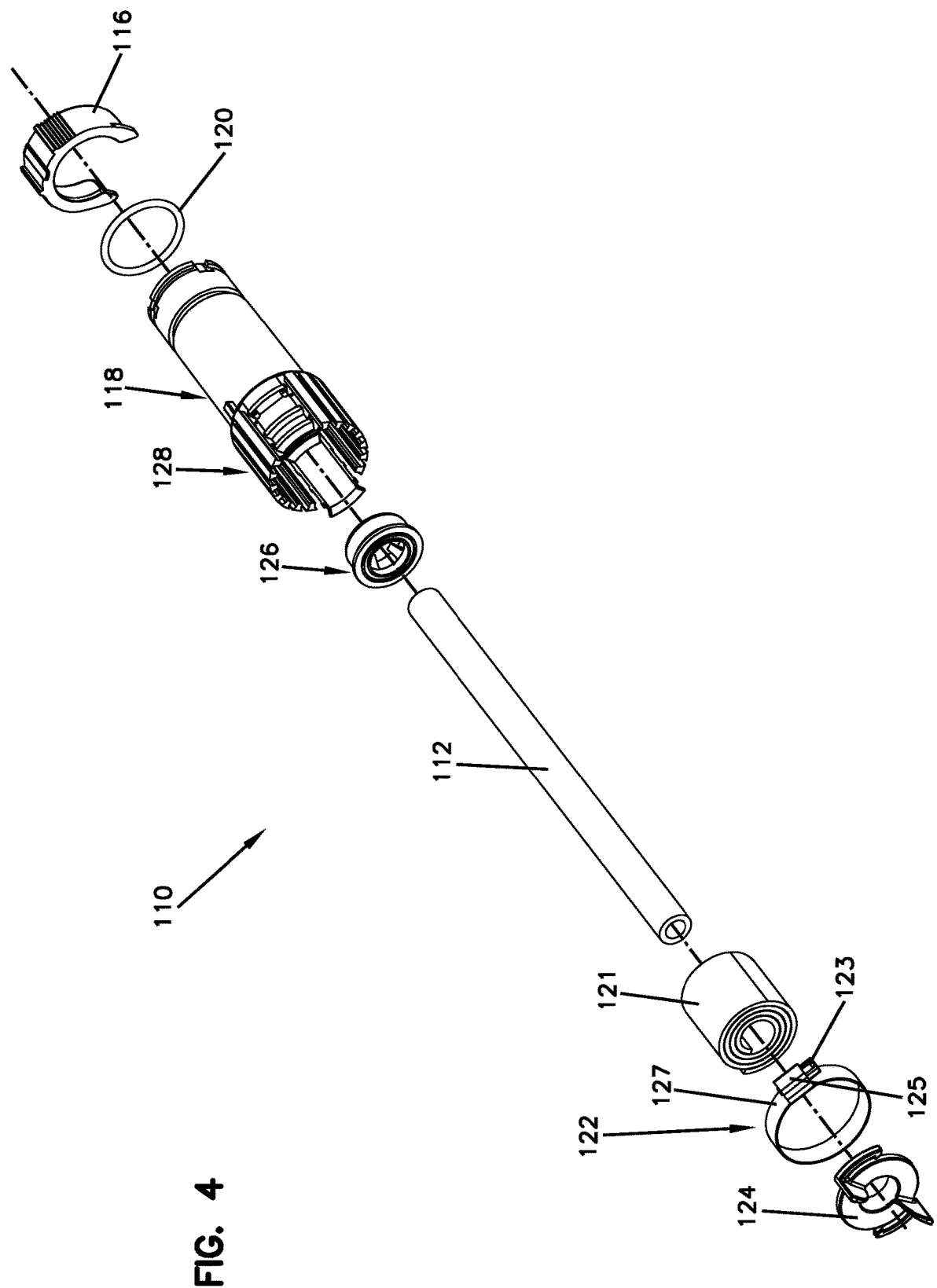
FIG. 4 illustrates an exploded view of the sealing block assembly of FIG. 3.

FIG. 4 shows an exploded view of the sealing block assembly 110. The sealing block assembly 110 includes the housing 118, the external seal 120, an inner seal 121, the clamp 122, an outer containment retainer 124, and an inner containment retainer 126. Additionally, in some embodiments, once installed in the port 109 of the enclosure, the sealing block assembly 110 includes the locking clip 116 attached to an end of the sealing block assembly 110.

The housing 118 is configured to receive and house the components of the sealing block assembly 110. In the depicted embodiments, an end of the housing 118 includes a plurality of fingers 128 that are movable. The fingers 128 aid in creating a seal around the cable 112 (discussed with respect to FIGS. 17-21). The fingers 128 preferably extend in a longitudinal direction parallel to a cable axis. Preferably, the fingers 128 are not connected at distal ends.

The external seal 120 is positioned around the housing 118 so as to create a seal between the sealing block assembly 110 and the port 109 of the enclosure. The seal 120 is flexible so as to conform to the port 109 and the housing 118 to create a complete seal. In the depicted embodiment, the external seal 120 is a rubberized O-ring. In some embodiments, other types of seals are used, such as gel seals, inflatable seals, sealants, or gaskets.

The inner seal 121 is positioned between the cable 112 and the housing 118. Specifically, the inner seal 121 is flexible and positioned around the cable 112. In the depicted embodiment, the inner seal 121 is a wrap mastic in the form of a tape wrapped multiple times around the cable until the desired thickness is achieved. In other embodiments, other types of seals may be used, such as gel seals, inflatable seals, sealants, or gaskets. The inner seal 121 is configured to be positioned around the cable 112 and compressed around the cable 112 by the fingers 128 of the housing 118 and the clamp 122 (discussed with respect to FIGS. 17-21).

The clamp 122 is configured to be positioned around the housing 118 to aid in creating a seal between the cable 112 and the sealing block assembly 110. In the depicted embodiment, the clamp 122 is a hose clamp; however, a variety of different clamps may be used. In the depicted embodiment, the clamp 122 is be tightened by rotating a screw 123 located at a clamp head 125. The screw 123 controls the diameter of a clamp band 127. The clamp 122 is positioned around the housing 118, specifically around the fingers 128, and tightened to compress the fingers 128 and the inner seal 121 around the cable 112.

The outer containment retainer 124, or cap, is positioned around the cable 112 at an end of the housing 118, adjacent the inner seal 121. The outer containment retainer 124 is secured to the housing 118 in order to contain the inner seal 121 within the housing 118. The outer containment retainer 124 helps to prevent the inner seal 121 from expanding or sliding outside of an end of the housing 118 when under compression by the clamp 122. Additionally, the outer containment retainer 124 aids in helping reduce axial movement of the cable 112 with respect to the sealing block assembly 110. In some embodiments, the inner seal 121 is attached to cable 112 and, in such an instance, when an axial (or pulling) force is applied to the cable 112, the inner seal 121 contacts the outer containment retainer 124, thereby helping to prevent the cable from moving in an axial direction with respect to the housing 118.

The inner containment retainer 126 is positioned around the cable 112 and within the housing 118 when the sealing block assembly 110 is assembled. Specifically, the inner containment retainer 126 is positioned on an opposite side of the inner seal 121 than the outer containment retainer 124. Accordingly, the inner containment retainer 126 and the outer containment retainer 124 cooperate to help retain the inner seal 121 within a portion of the housing 118, specifically the portion of the housing 118 containing the fingers 128.

Figure 5:
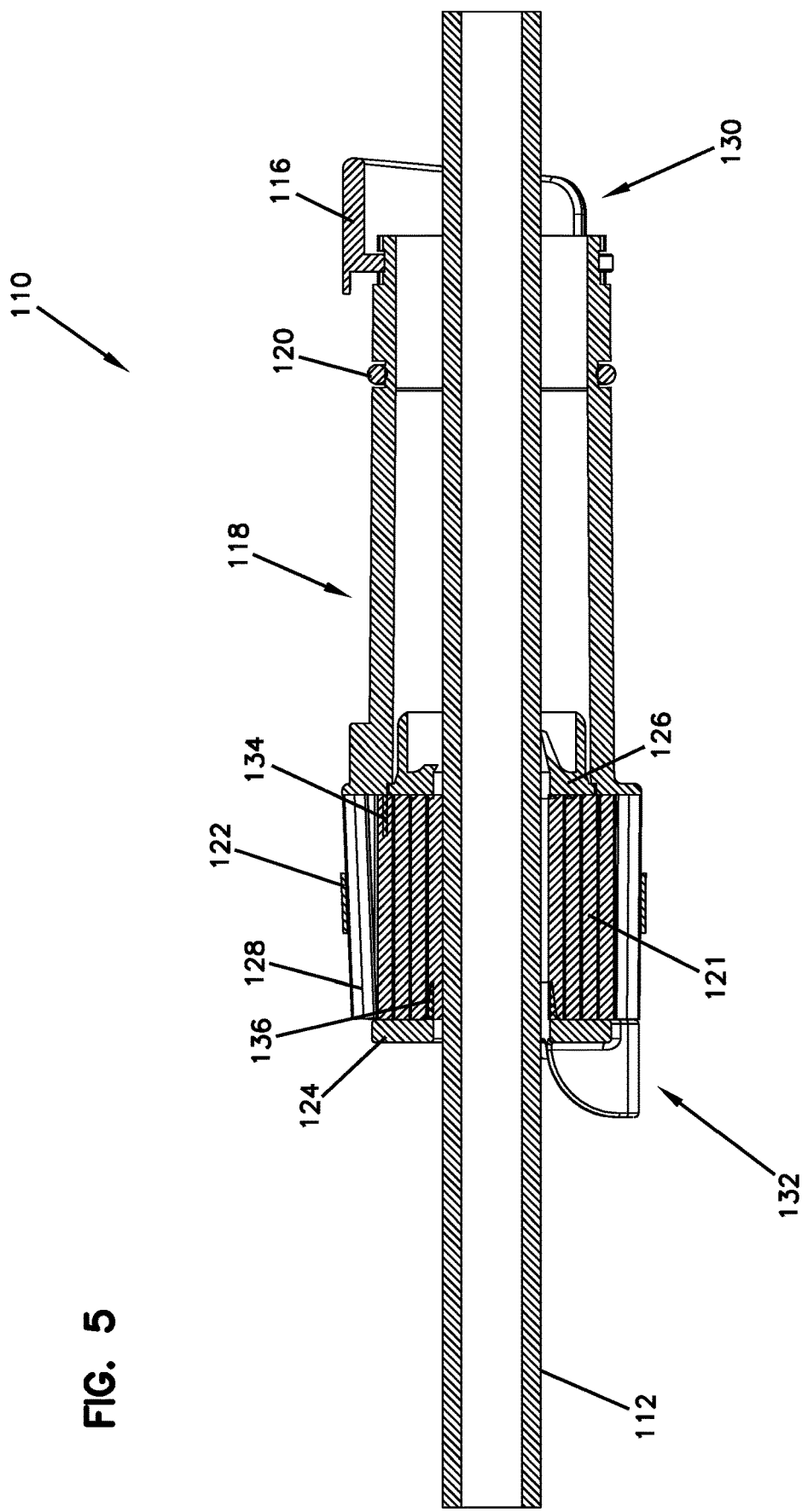
FIG. 5 illustrates a cross-sectional view of the sealing block assembly along line 5-5 in FIG. 3.

FIG. 5 shows a cross-sectional view of the sealing block assembly 110. The housing 118 has a first end 130 and a second end 132. At the first end 130, the housing 118 is shown to include the external seal 120 positioned around the housing 118 and the locking clip 116 attached to the housing 118.

At the second end 132 of the housing 118, the clamp 122 is shown compressing both the fingers 128 and the inner seal 121 around the cable 112. Additionally, the outer containment retainer 124 and the inner containment retainer 126 are shown positioned on opposite sides of the inner seal 121. In the depicted embodiment, the housing 118 is also shown to include a rib 134 secured within the housing 118 proximate to the fingers 128. The rib 134 is configured to penetrate the inner seal 121 to aid in sealing the sealing block assembly 110 from the entry of moisture from around the inner seal 121. In the depicted embodiment, the rib 134 is configured to form a 360 degree ring that completely encircles the cable 112. Also at the second end 132, the outer containment retainer 124 is secured to the housing 118. The outer containment retainer 124 includes a rib 136 that is configured to prevent the fingers 128 from being overly compressed. The rib 136 acts as a controlled stop of the fingers 128. The rib 136 is configured to penetrate the inner seal 121 to aid in sealing the sealing block assembly 110 from the entry of moisture from around the inner seal 121. In the depicted embodiment, the rib 136 is configured to completely encircle the cable 112, forming a 360 degree ring.

Figure 6:
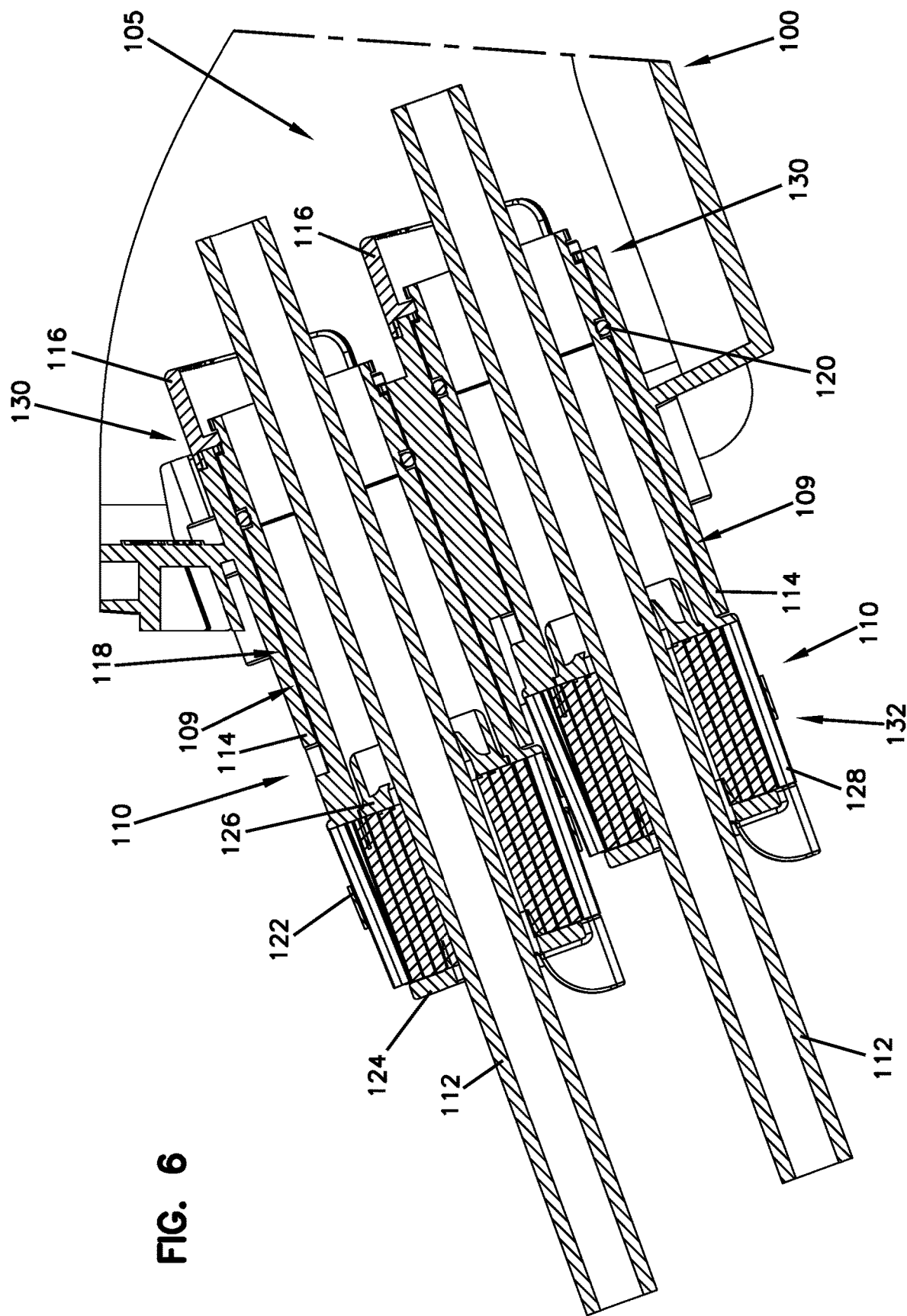
FIG. 6 illustrates a cross-sectional view of the sealing block assembly along line 6-6 in FIG. 1.

FIG. 6 shows a cross-sectional view of multiple sealing block assemblies 110 positioned within the ducts 114 that define the ports 109 of the enclosure. As shown, the housing 118 is configured so that only a portion of the housing 118 fits within the duct 114, specifically, the second end 132 of the housing 118 is sized so that it cannot pass through the duct 114 and into the interior of the enclosure. By configuring the housing 118 is this way, the oversized second end 132 and the locking clip 116 on the first end 130 prevent the sealing block assembly 110 from moving axially within the duct 114. This prevents accidental removal of the sealing block assembly 110 from the enclosure.

Figure 7:
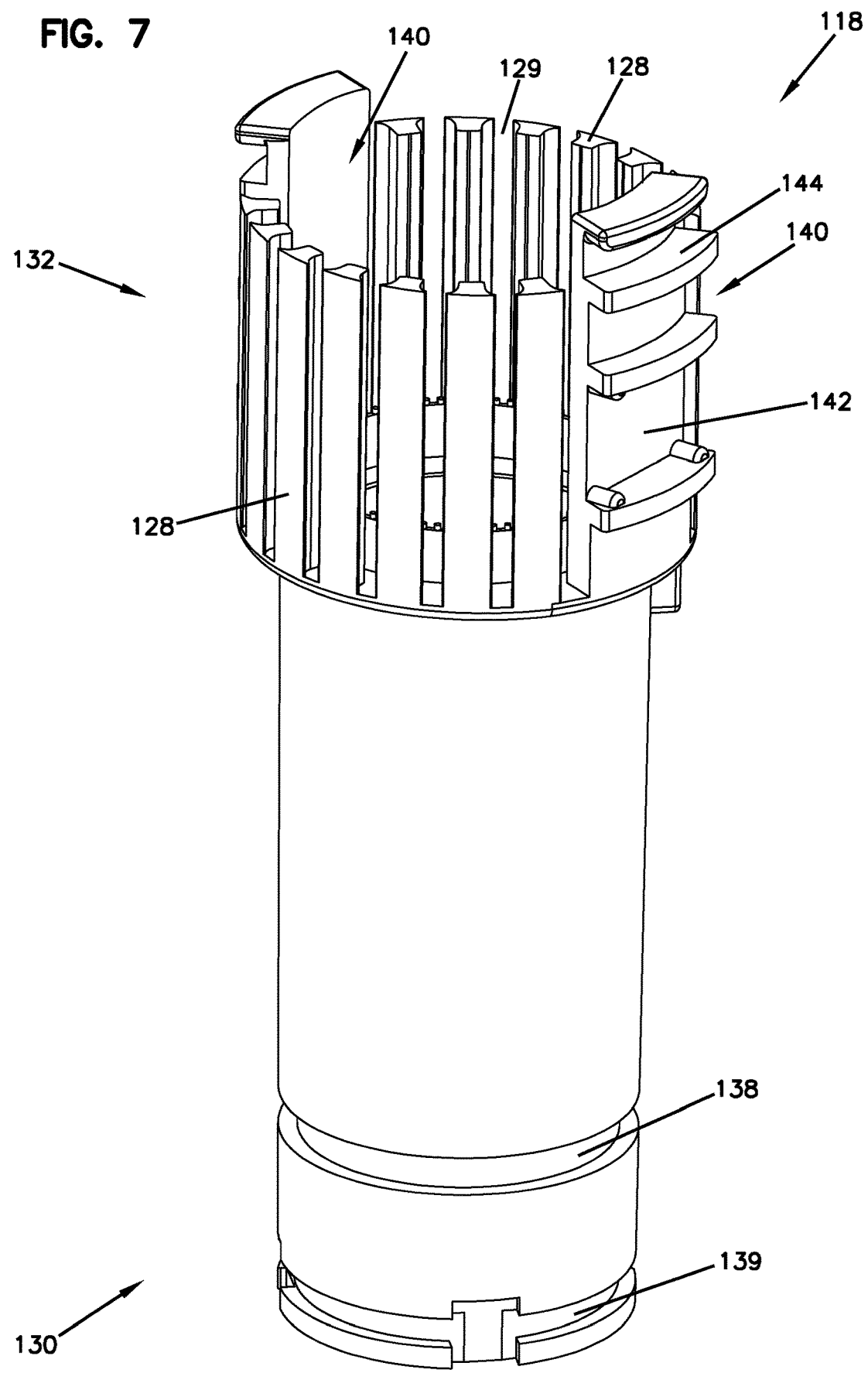
FIG. 7 illustrates a perspective view of a sealing block assembly housing, according to one embodiment of the present disclosure.

FIG. 7 shows a perspective view of the housing 118 of the sealing block assembly 110. The housing 118 has a generally cylindrical shape. At the first end 130, the housing 118 includes an external seal recess 138 and a locking clip recess 139. The external seal recess 138 is configured to receive the external seal 120 (as shown in FIG. 5). The locking clip recess 139 is configured to receive the locking clip 116 (as shown in FIG. 5).

At the second end 132 of the housing 118, the fingers 128 are disposed. The fingers 128 are generally disposed around the perimeter of the housing 118, generally parallel to a longitudinal axis of the housing 118. The fingers 128 define the outer diameter of the second end 132 of the housing 118. The outer diameter of the second end 132 of the housing 118 is larger than the outer diameter of the first end 130 of the housing 118 (as shown in FIG. 6). The housing 118 can include any number of fingers 128 so long as they are partially flexible, or movable, and strong enough to withstand a compression force exerted by the clamp 122. Additionally, the fingers 128 are separated by gaps 129. When fully assembled, the inner seal 121 of the sealing block assembly 110 can flow into the gaps 129 between the fingers 128, thereby increasing the overall seal with the housing 118.

In the depicted embodiment, the second end 132 also includes a pair of posts 140. The posts 140 provided rigidity to the housing 118. Specifically, the posts 140 prevent the clamp 122 from over-compressing the fingers 128 when the sealing block assembly 110 is assembled. Additionally, the posts 140 provide a mounting location for the clamp band 127, clamp head 125, and the outer containment retainer 124. Specifically, the posts 140 include a clamp recess 142 configured to receive the clamp head 125 or clamp band 127. The clamp recess 142 helps to retain the clamp 122 in a fixed position around the fingers 128 and prevents the clamp 122 from sliding longitudinally along the housing. The posts 140 also include an outer containment retainer recess 144 that is configured to receive a portion of the outer containment retainer 124 so as to provide a mounting location for the outer containment retainer 124 to be fixed to the housing 118.

Figure 8:
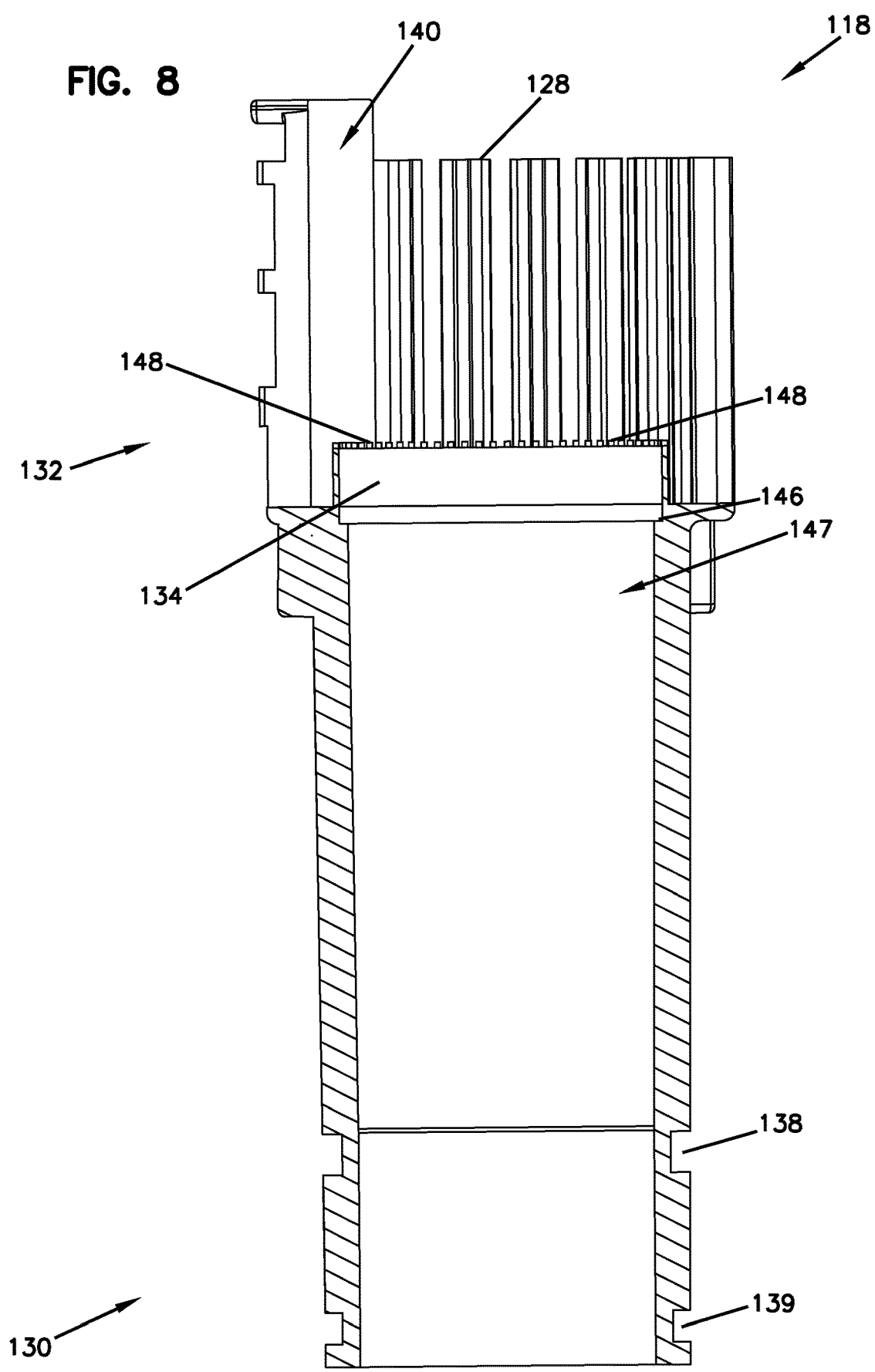
FIG. 8 illustrates a cross-sectional side view of the housing of FIG. 7.

FIG. 8 shows a partial cutaway for the housing 118. The inside of the housing 118 includes the rib 134 and an inner containment retainer lip 146. The rib 134 is a raised ring disposed around the housing 118, inside the fingers 128. In some embodiments, the rib 134 can include a plurality of small protrusions 148 so as to easily configure the rib 134 to penetrate the inner seal 121 (as shown in FIG. 5). In other embodiments, the rib 134 has a sharpened edge.

The inner containment retainer lip 146 is a ledge on the inner surface 147 of the housing 118. The inner containment retainer lip 146 is configured to receive the inner containment retainer 126 and prevent the inner containment retainer 126 from traveling through the housing to the first end 130. Specifically, the inner containment retainer lip 146 provides a physical stop for the inner containment retainer 126 so that the retainer 126 is not forced by the expanding inner seal 121 in a direction toward the first end 130.

Figure 9:
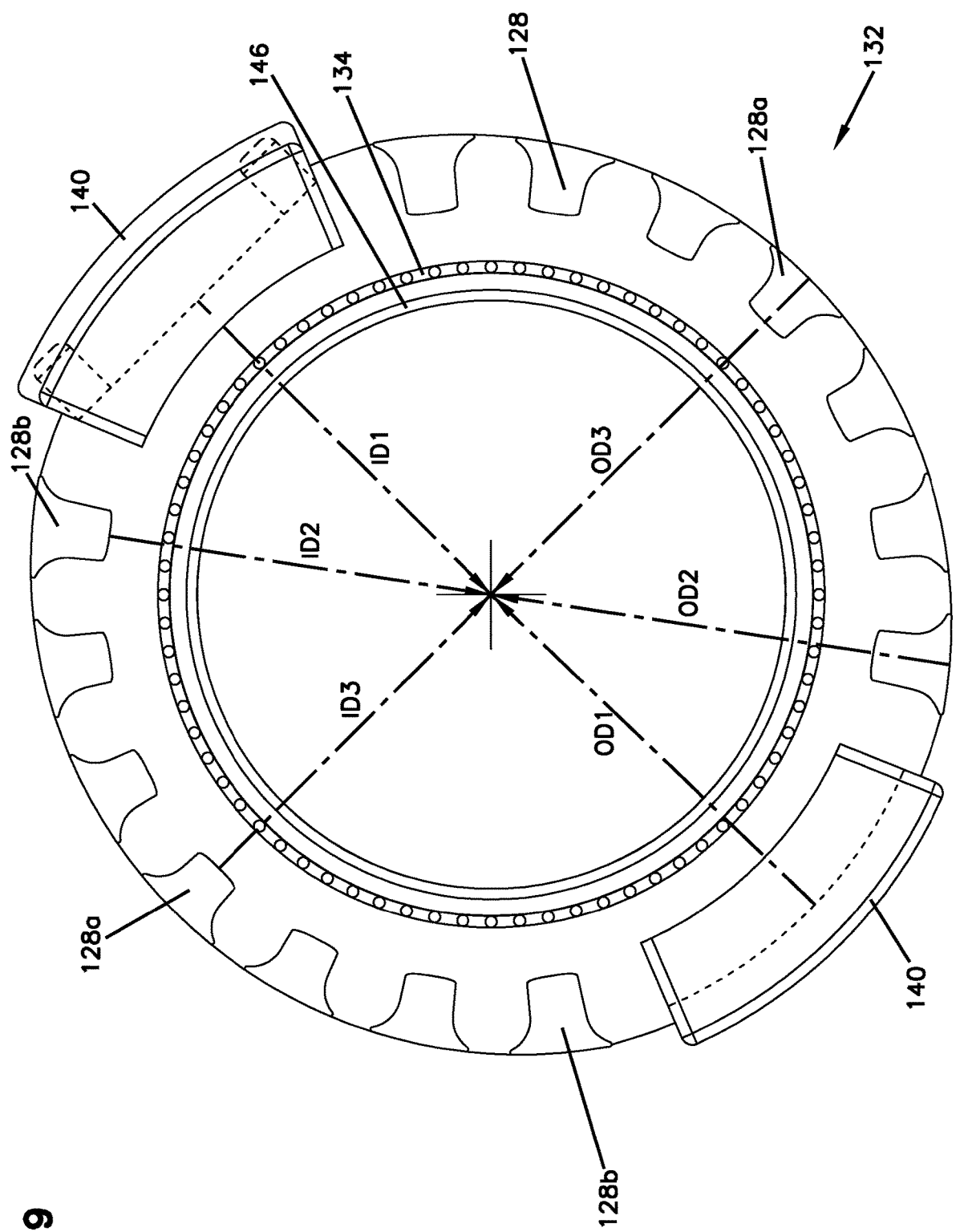
FIG. 9 illustrates an end view of the housing of FIG. 7.

FIG. 9 shows the second end 132 of the housing 118. The fingers 128 each move differently when under force by the clamp 122. This is due to posts 140 resisting movement when under force by the clamp 122. Therefore, to counter this behavior by the fingers 128, the second end 132 includes a plurality of different inner diameters and outer diameters when uncompressed so as to distribute the desired force on particular fingers 128, and, therefore, the inner seal 121 (not shown). Specifically, because the posts 140 are configured to resist movement, the fingers 128a positioned further from the posts 140 are moved a greater distance than the fingers 128b positioned closer to the posts. Therefore, an inner diameter ID3 on the fingers 128a is greater than an inner diameter ID2 and an inner diameter ID1 due to the increased movement when under force by the clamp 122. Further, ID1 is less than both ID2 and ID3. In some embodiments, once under compression by the clamp 122, some inner and outer diameters may be equal depending on clamping force exerted on the second end 132 by the clamp 122. Also, in some embodiments, the outer diameter OD2 is greater than the outer diameter OD1 and also greater than the outer diameter OD3.

Figure 10:
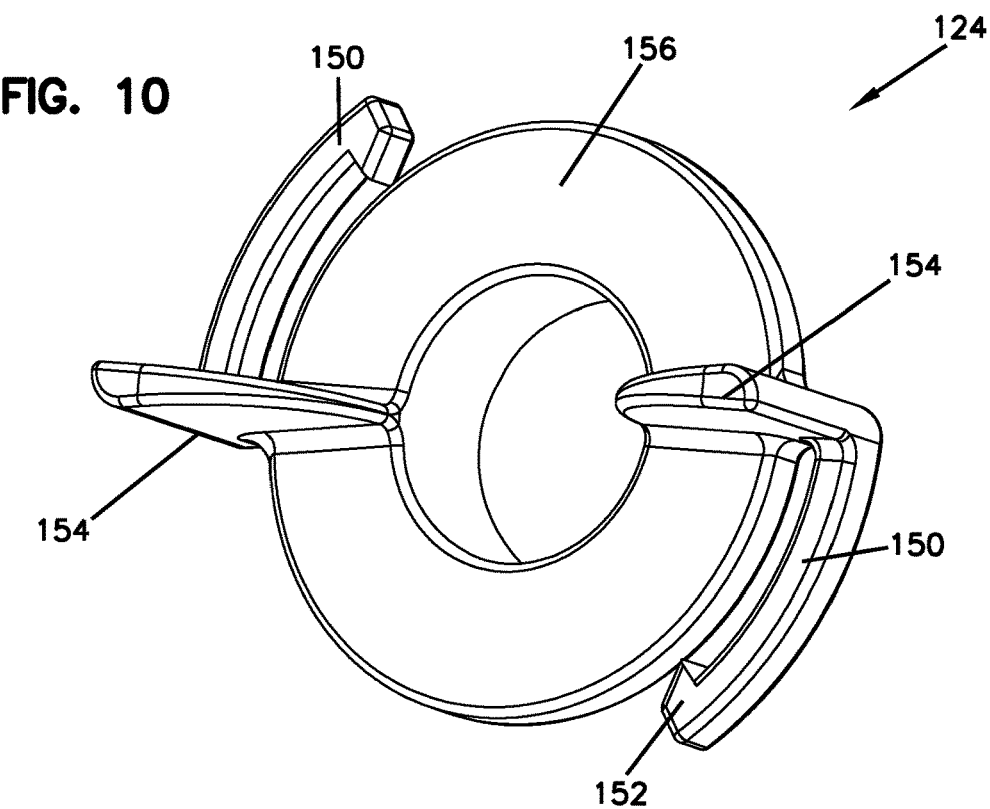
FIGS. 10-11 illustrate a front perspective view and a rear a perspective view, respectively, of an outer containment retainer of the sealing block assembly of FIG. 3, according to one embodiment of the present disclosure.
Figure 11:
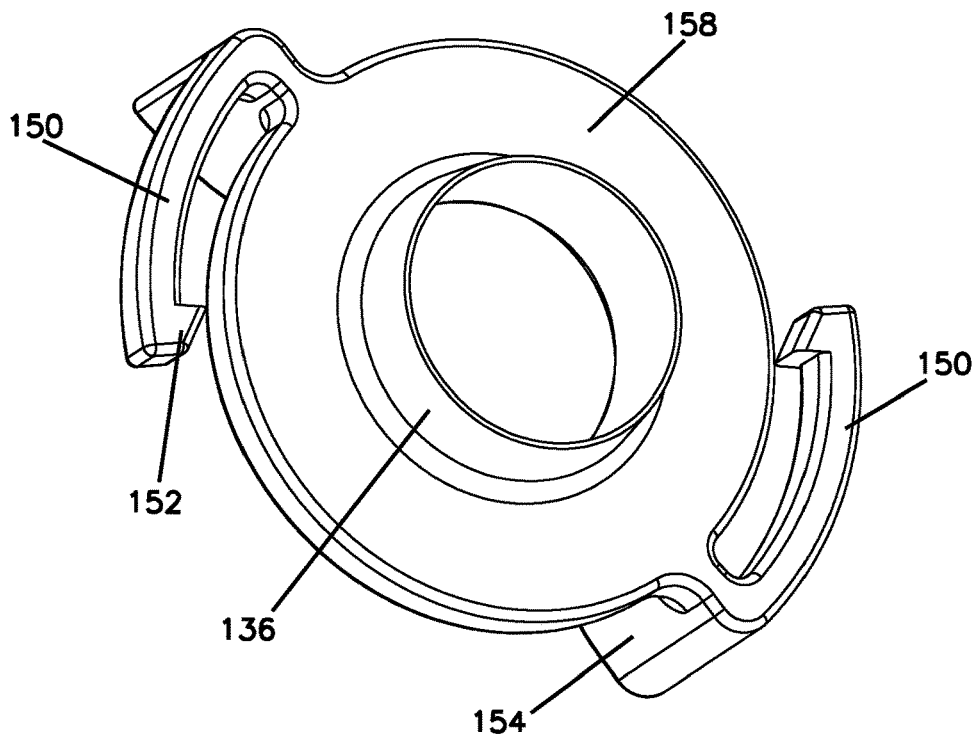

FIG. 10 shows the front of the outer containment retainer 124, and FIG. 11 shows the rear of the outer containment retainer 124. The outer containment retainer 124 includes a pair of arms 150 positioned at the periphery of the outer containment retainer 124. The arms 150 are curved and include hooks 152. The arms 150 are configured to cooperate with the housing 118, specifically the outer containment retainer recesses 144 of the posts 140, so as to secure the outer containment retainer 124 to the housing 118. The hooks 152 are configured to lock the outer containment retainer 124 to the outer containment retainer recesses 144 of the posts 140.

The outer containment retainer 124 also includes a pair of tightening wings 154 fixed on a front face 156 of the outer containment retainer 124. The wings 154 are configured to aid rotating the outer containment retainer 124 during installation and removal.

The outer containment retainer 124 also includes the rib 136 projecting from a rear face 158. In some embodiments, the rib 136 can be sharpened for easy penetration of the inner seal 121 (as shown in in FIG. 5). The rib 136 has a diameter greater than the inner diameter of the inner seal 121 but less than the outer diameter of the inner seal 121.

Figure 12:
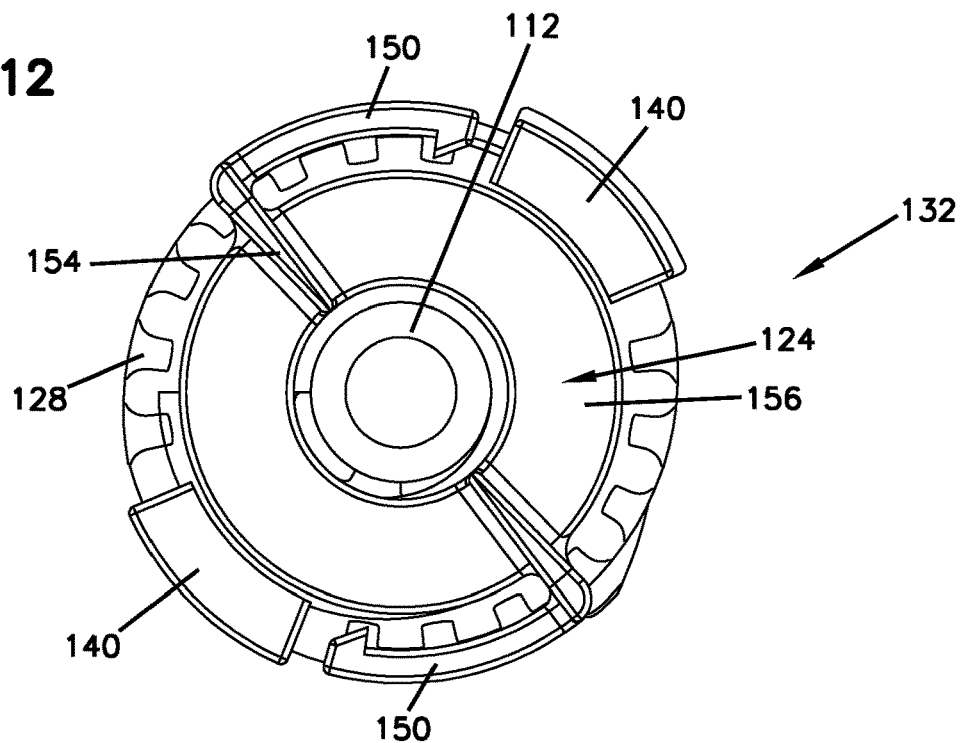
FIGS. 12-13 illustrate end views of the outer containment retainer of FIGS. 10-11 and the housing of FIG. 7 during installation of the outer containment retainer.
Figure 13:
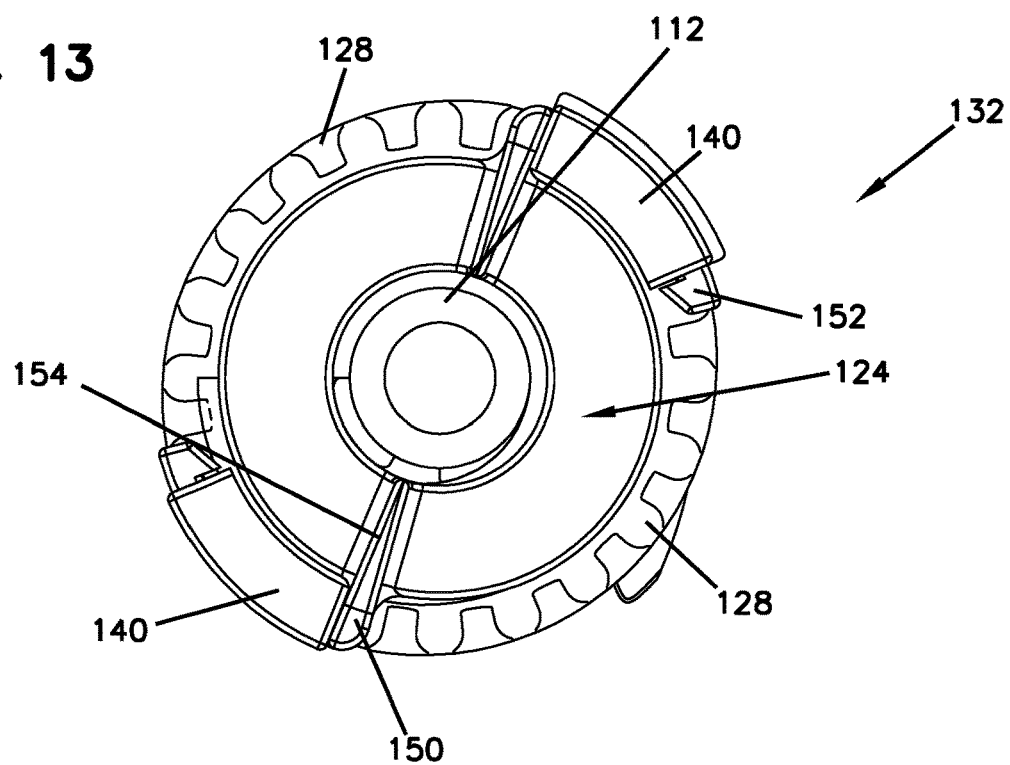

FIGS. 12 and 13 show the outer containment retainer 124 during installation to the housing 118. The outer containment retainer 124 is positioned around the cable 112 near the second end 132 of the housing 118. The rib 136 is then inserted into the inner seal 121 until the rear face 158 is positioned against the inner seal 121. The outer containment retainer 124 is rotated by using the wings 154 until the arms 150 are seated within the posts 140 (as shown in FIG. 13). The hooks 152 then secure the outer containment retainer 124 to the posts 140, preventing accidental removal of the outer containment retainer 124 from the housing 118.

Figure 14:
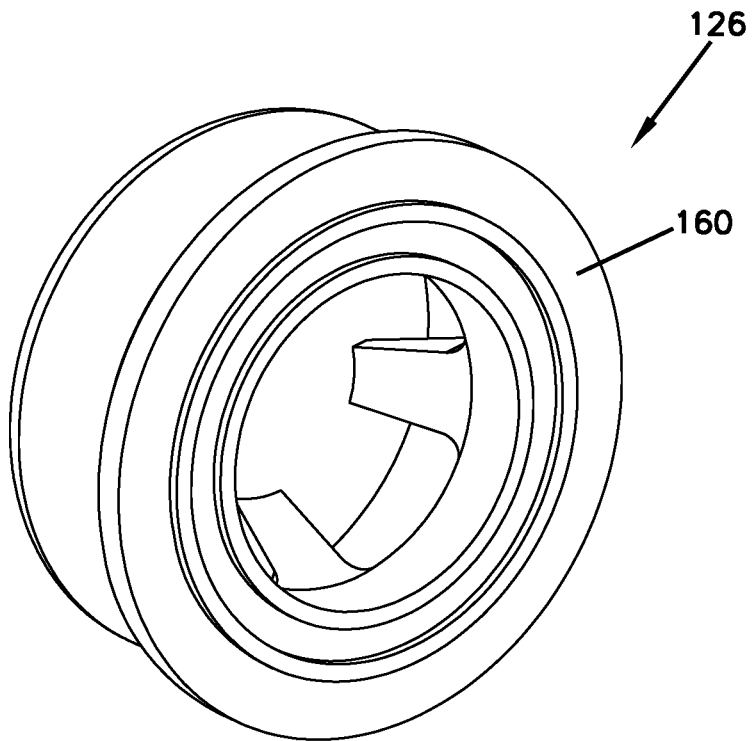
FIGS. 14-15 illustrate a front perspective view and a rear a perspective view, respectively, of an inner containment retainer of the sealing block assembly of FIG. 3, according to one embodiment of the present disclosure.
Figure 15:
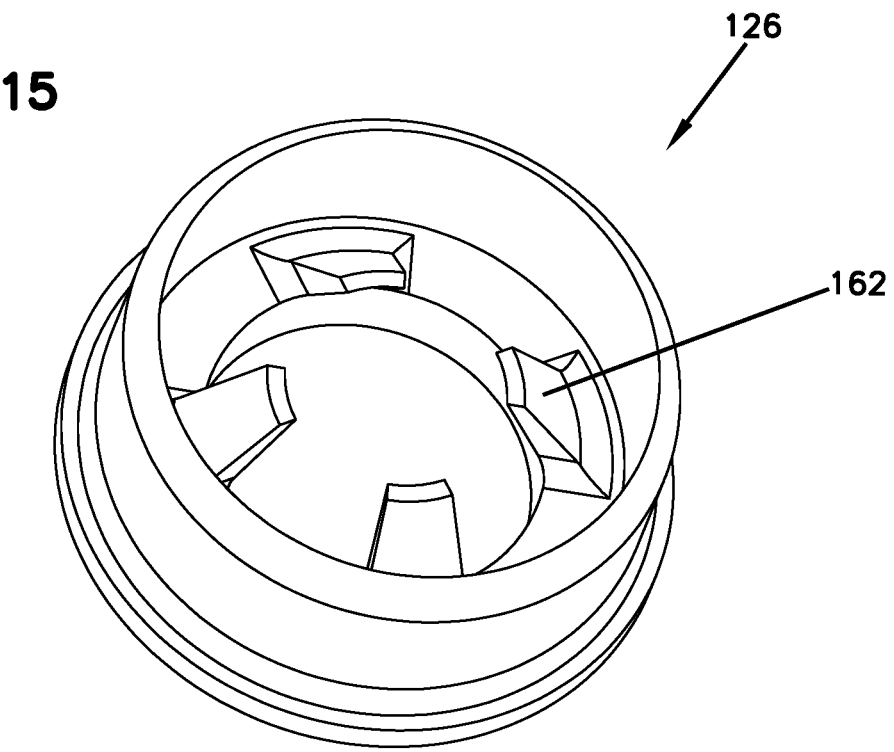

FIGS. 14-15 show front and rear perspective views of inner containment retainer 126, respectively. The inner containment retainer 126 is configured to be positioned around the cable 112 and positioned within the housing 118 between the inner seal and the first end 130. The front face 160 of the inner containment retainer 126 is configured to make contact with the inner seal 121 (as shown in FIG. 5) so as to resist flow of the inner seal 121 when the inner seal 121 is compressed by the clamp 122. The front face 160 is further configured to rest on the inner containment retainer lip 146 of the housing.

As shown in FIG. 15, the inner containment retainer 126 includes cable fixation supports 162 at the rear of the inner containment retainer 126. The cable fixation supports 162 are configured to help secure the inner containment retainer 126 to the cable 112 so that the inner containment retainer 126 helps to prevent axial movement of the cable 112 with respect to the housing 118. Because the inner containment retainer 126 is fixed to the cable 112, between the inner seal 121 and the inner containment retainer lip 146, the inner containment retainer lip 146 resists axial forces applied to the cable 112 by pressing against the inner seal 121 and the inner containment retainer lip 146.

Figure 16:
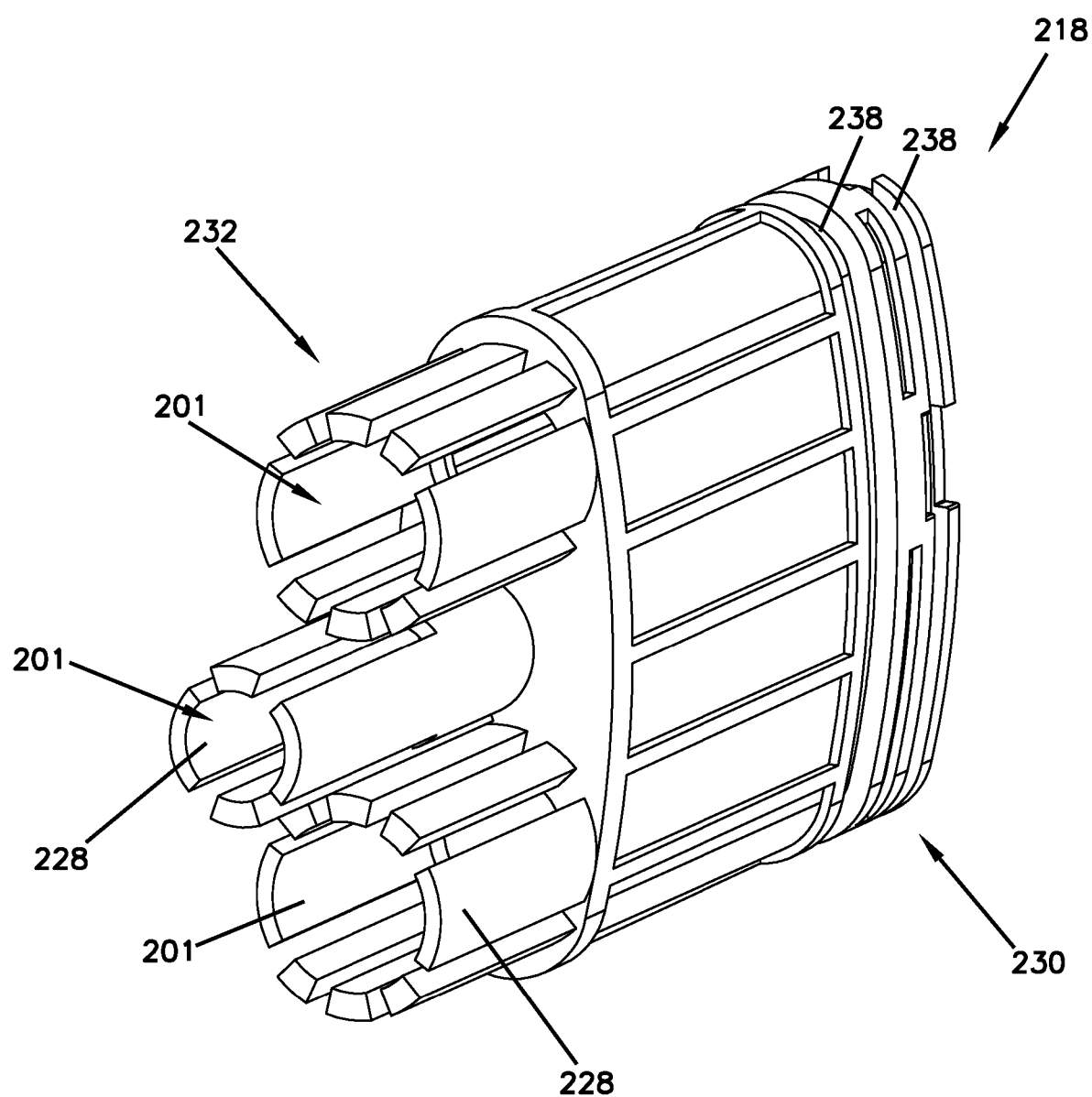
FIG. 16 illustrates a perspective view of another sealing block assembly housing, according to one embodiment of the present disclosure.

FIG. 16 shows a perspective view of a housing 218, according to one embodiment of the present disclosure. The housing 218 can be a part of an alternative sealing block assembly, similar to the sealing block assembly 110. The housing 218 has a generally oval or oblong cross-sectional profile and is configured to be placed within an oval shaped port on the base 100 of an enclosure (as shown in FIGS. 1-2). At the first end 230, the housing 218 includes a plurality of recesses 238 that are configured to receive external seals and/or locking clip mechanisms, similar to the external seal 120 and locking clip 116 shown in FIG. 4. At the second end 232, the housing 218 includes a plurality of housing ports 201 that each include a plurality of fingers 228. Such fingers 228 are similar to the fingers 128 of the housing 118 as shown in FIG. 7. Each housing port 201 can be configured to receive a separate cable 112. Each cable 112 can be individually sealed within each port 201 by using an assembly similar to the sealing block assembly 110 as shown in FIG. 4. In some embodiments, not all housing ports 201 are occupied by a cable.

Figure 17:
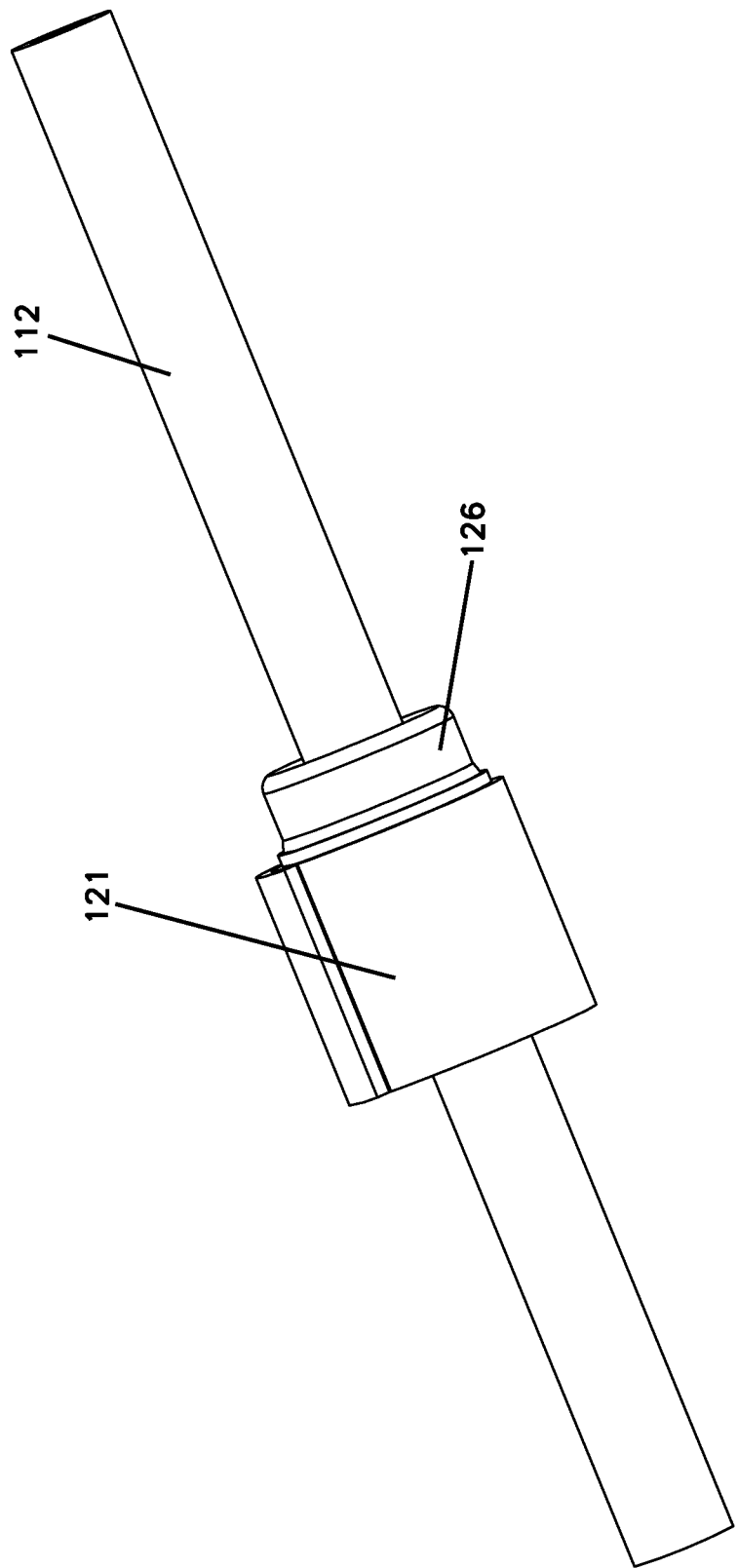
FIGS. 17-21 illustrate the assembly steps of forming the sealing block assembly of FIG. 3, according to one embodiment of the present disclosure.

FIGS. 17-21 show the process of assembling the sealing block assembly 110. As shown in FIG. 17, the inner seal 121 is attached to the cable 112. In the depicted embodiment, the inner seal 121 is a wrap mastic. The inner seal 121 is wrapped around the cable 112, creating a generally cylindrical seal. In some embodiments, the inner seal 121 is stretched when first wrapping the cable 112 and also stretched when finishing the wrapping of the cable 112. The inner seal 121 is wrapped around the cable 112 until a desired outer diameter of the inner seal 121 is achieved. After the inner seal 121 is attached to the cable 112, the inner containment retainer 126 is secured around the cable 112 adjacent to the inner seal 121.

Figure 18:
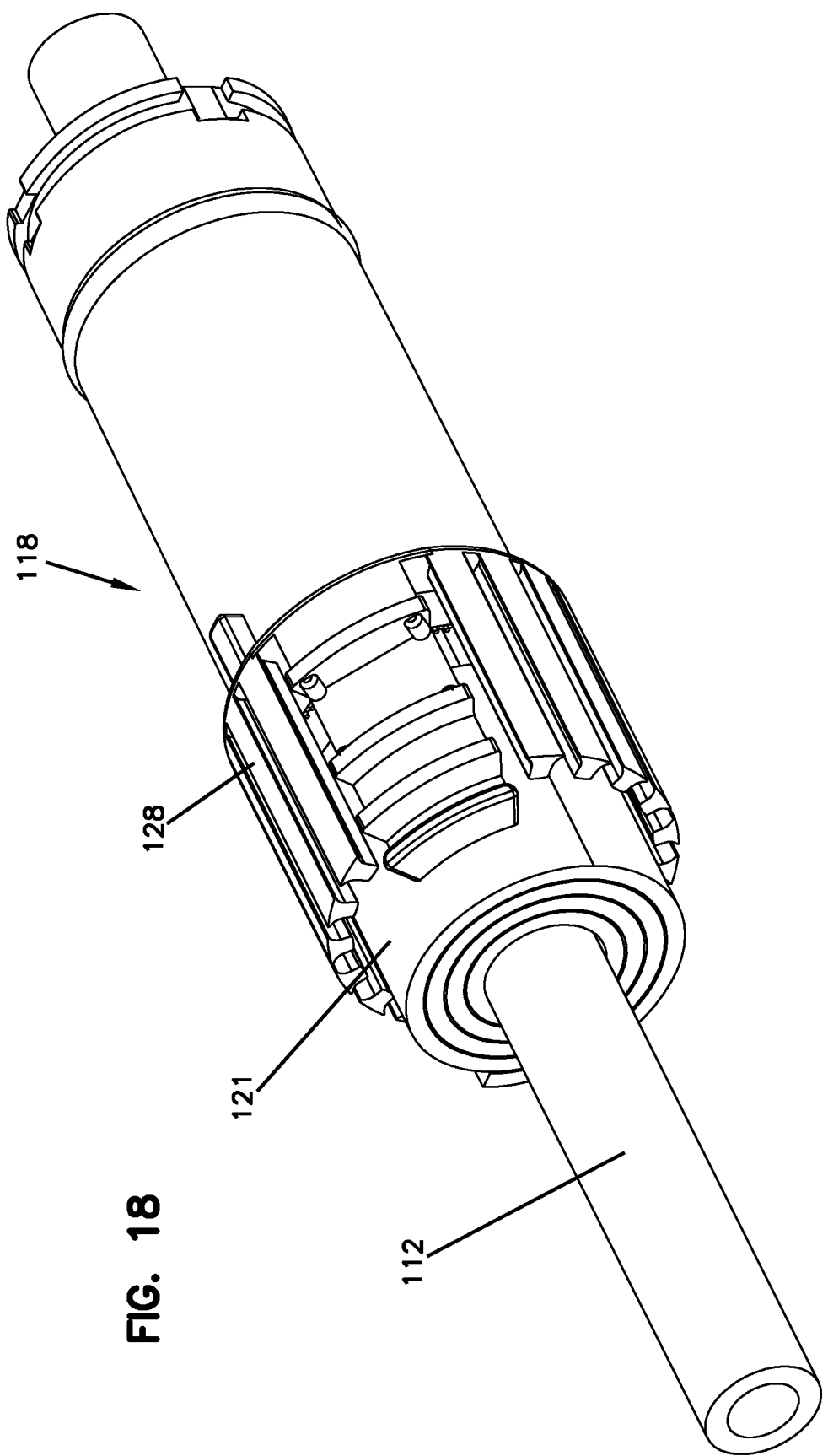
Figure 19:
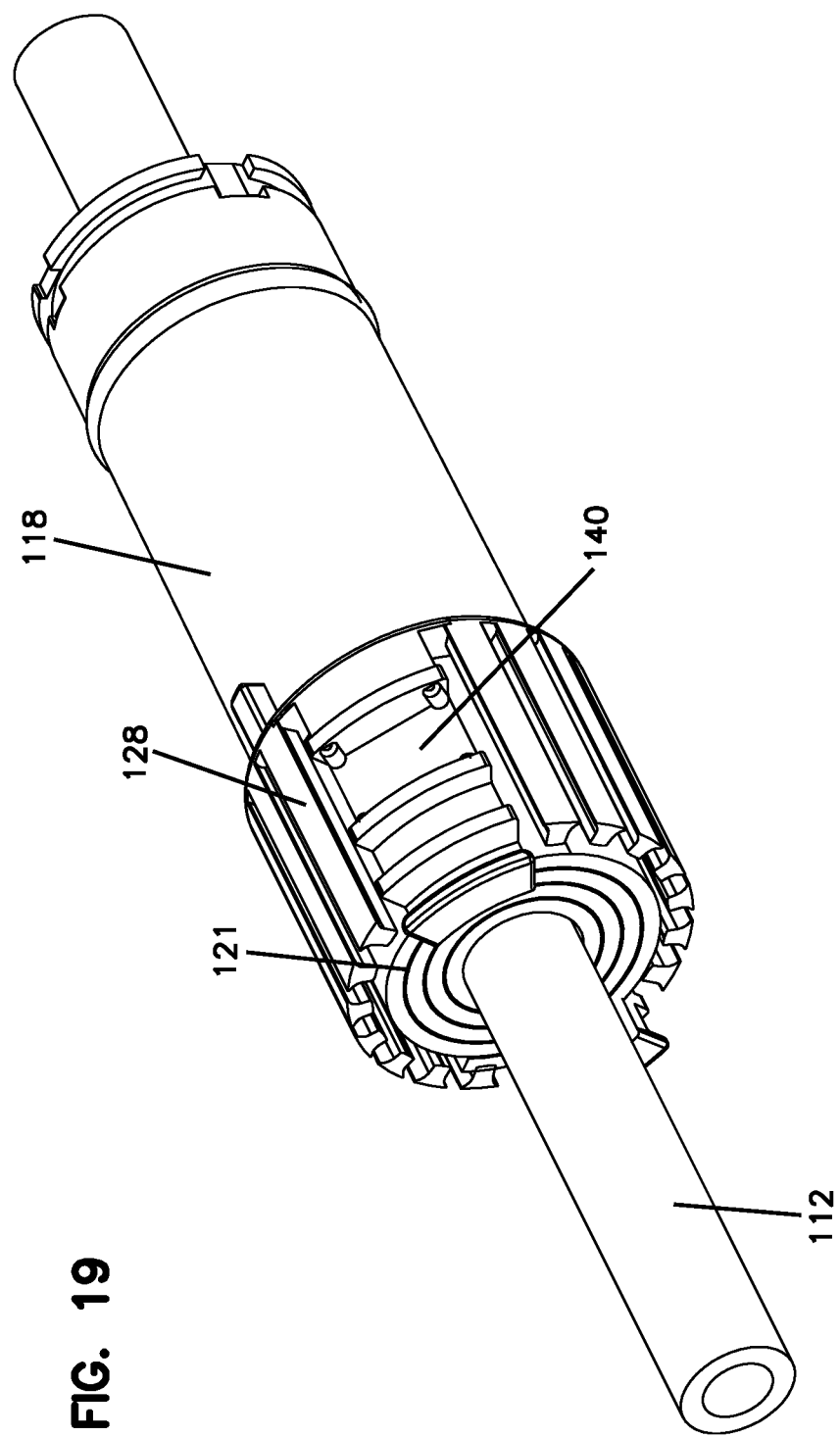
Figure 20:
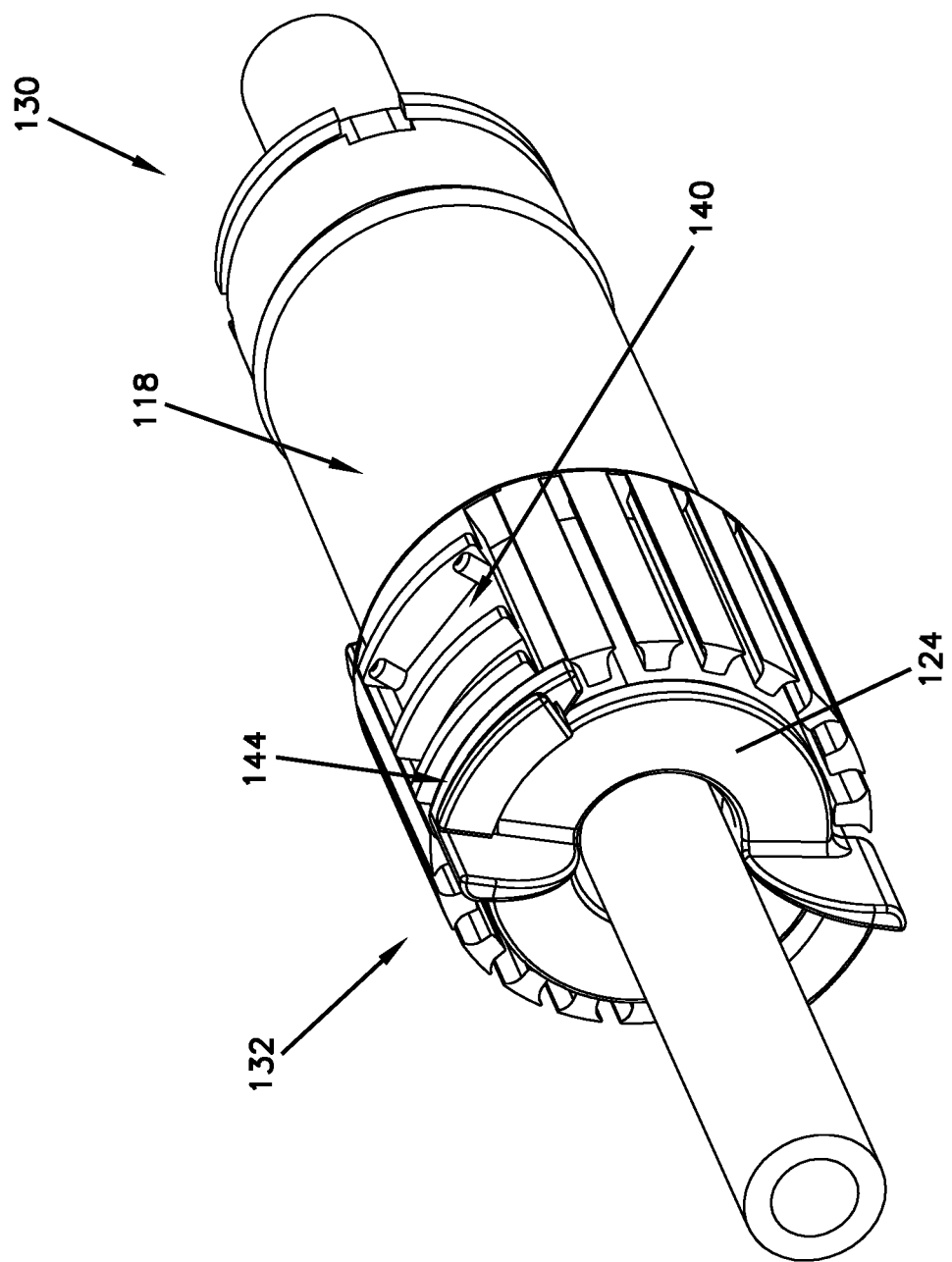
Figure 21:
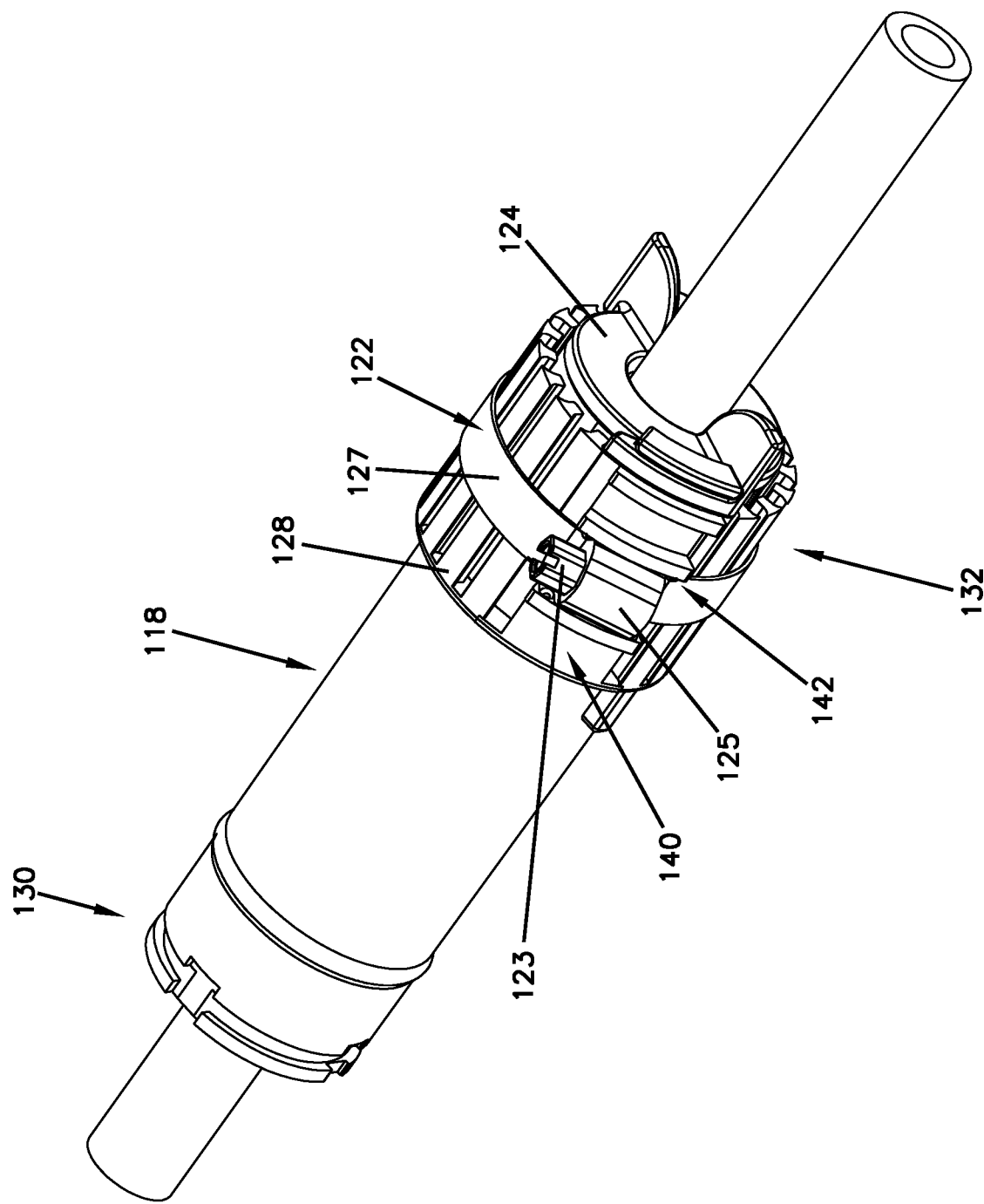

As shown in FIG. 18, the cable 112 with the inner seal 121 and the inner containment retainer 126 is inserted into the housing 118. In some embodiments, the outer diameter of the inner seal 121 is greater than the inner diameter of the majority of the fingers 128 of the housing 118. Therefore, because the fingers 128 are movable and flexible, the fingers 128 can be flexed outwardly when inserting the cable 112 with the inner seal 121 attached thereto. In some embodiments, the inner containment retainer 126 is placed within the housing 118 first and then the cable 112 with the inner seal 121 attached thereto is inserted through the inner containment retainer 126 as the cable 112 is inserted through the housing 118. As shown in FIG. 19, the cable 112 is inserted into the housing 118 until the inner seal 121 is positioned within the housing 118, proximate to the fingers 128 and the posts 140. As shown in FIG. 20, after the inner seal 121 is positioned within the housing 118, the outer containment retainer 124 is secured to the second end 132 of the housing 118, specifically to the outer containment retainer recesses 144 of the posts 140. As shown in FIG. 21, after the outer containment retainer 124 is secured to the housing 118, the clamp 122 is secured around the housing 118. The clamp 122 is tightened by reducing the diameter of the band 127 by rotating the screw 123 on the head 125 of the clamp 122. The clamp 122 is positioned within the clamp recesses 142 of the posts 140, and the clamp 122 is tightened to a desired tightness so that a desired seal is created between the inner seal 121 and the cable 112.

After the sealing block assembly 110 is assembled, the sealing block assembly is ready for installation into a duct 114 of the enclosure. Once in the duct 114, the locking clip 116 can then be secured to the first end 130 of the housing 118, thereby completing the installation of the sealing block assembly 110.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

PARTS LIST

100 base
101 first end
102 second end
103 first side
104 second side
105 interior
106 sidewall
108 bottom
109 cable port
110 sealing block assembly
112 cable
114 duct
116 locking clip
118 housing
120 external seal
121 inner seal
122 clamp
123 screw
124 outer containment retainer
125 clamp head
126 inner containment retainer
127 clamp band
128 finger
129 gap
130 first end of housing
132 second end of housing
134 rib
136 rib
138 external seal recess
139 locking clip recess
140 post
142 clamp recess
144 outer containment retainer recess
146 inner containment retainer lip
147 inner surface of housing
148 protrusion
150 arm
152 hook
154 tightening wing
156 front face of outer containment retainer
158 rear face of outer containment retainer
160 front face of inner containment retainer
162 cable fixation support
201 housing port
218 housing
228 finger
230 first end of housing
232 second end of housing
238 recess

What is claimed is:

1. A sealing block assembly for being disposed around a telecommunications cable comprising:
a housing including:
a first end being configured to be received in a port; and
a second end including a plurality of movable fingers and at least one mounting location, the at least one mounting location latching with an outer containment retainer, the plurality of movable fingers having a first end and a second end, wherein the first end of the plurality of movable fingers is closer to the first end of the housing than the second end of the plurality of movable fingers, and wherein the at least one mounting location is positioned at the second end of the plurality of movable fingers;
a seal disposed within the housing, the seal being positioned between the plurality of movable fingers and the telecommunications cable;
a clamp disposed around the plurality of movable fingers of the housing, the clamp being configured to compress the plurality of movable fingers and the seal;
the outer containment retainer having at least one securing member configured to latch with the at least one mounting location so as to secure the outer containment retainer to the housing at the second end of the housing and reduce relative rotation between the outer containment retainer and the housing, the outer containment retainer being configured to contain the seal within the housing; and
an inner containment retainer positioned around the telecommunications cable, adjacent to the seal, opposite the outer containment retainer, wherein the inner containment retainer is positioned within the housing between the first and second ends of the housing;
wherein the plurality of movable fingers includes two opposite movable fingers wider than the other movable fingers of the plurality of movable fingers, and the clamp is placed between two ribs apart from each other on an outer surface of each of the two opposite fingers to prevent the movement of the claim in a longitudinal direction of the housing.

2. The sealing block assembly of claim 1, further comprising an external seal positioned around the first end of the housing.

3. The sealing block assembly of claim 1, wherein the first end of the housing is configured to receive a locking clip.

4. The sealing block assembly of claim 1, wherein the outer containment retainer includes a rib that is configured to penetrate the seal.

5. The sealing block assembly of claim 1, wherein the housing includes a rib that is configured to penetrate the seal.

6. The sealing block assembly of claim 1, wherein the seal is a wrap secured around the cable.

7. The sealing block assembly of claim 1, wherein the outer containment retainer is positioned over the cable at one side of the seal, and the inner containment retainer is positioned over the cable on an opposite side of the seal.

8. The sealing block assembly of claim 1, wherein the inner containment retainer includes a cable fixation support, the cable fixation support being configured to secure the inner containment retainer on the cable.

9. The sealing block assembly of claim 1, wherein the seal has an outer diameter larger than an inner diameter of the plurality of movable fingers of the housing when the sealing block is unassembled.

10. The sealing block assembly of claim 1, wherein the housing has a generally oval shaped cross-section.

11. The sealing block assembly of claim 1, wherein the housing has a generally circular cross-section.

12. The sealing block assembly of claim 1, wherein the sealing block assembly is watertight.

13. The sealing block assembly of claim 12, further comprising a plurality of ports positioned at the second end of the housing, wherein each port includes a plurality of fingers.

* * * * *

UNITED STATES PATENT AND TRADEMARK OFFICE
CERTIFICATE OF CORRECTION

PATENT NO. : 10,811,862 B2
APPLICATION NO. : 15/575735
DATED : October 20, 2020
INVENTOR(S) : Dirk Kempeneers et al.

Page 1 of 1

It is certified that error appears in the above-identified patent and that said Letters Patent is hereby corrected as shown below:

In the Claims

Column 10, Line 42, Claim 1: "movement of the claim in a longitudinal" should read --movement of the clamp in a longitudinal--

Signed and Sealed this
Fourth Day of May, 2021

Drew Hirshfeld
*Performing the Functions and Duties of the
Under Secretary of Commerce for Intellectual Property and
Director of the United States Patent and Trademark Office*